Aug. 8, 1939.  T. McG AIKEN  2,168,893
CAMERA
Filed Feb. 11, 1938  4 Sheets-Sheet 1

INVENTOR
Thomas McG. Aiken,
By Archworth Martin
Attorney

Aug. 8, 1939.   T. McG. AIKEN   2,168,893
CAMERA
Filed Feb. 11, 1938   4 Sheets-Sheet 2
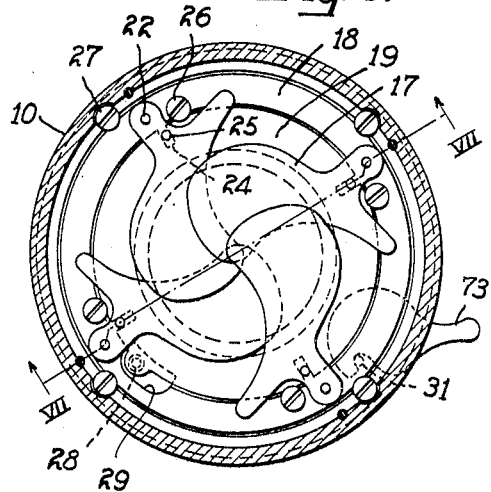
Fig. 5.
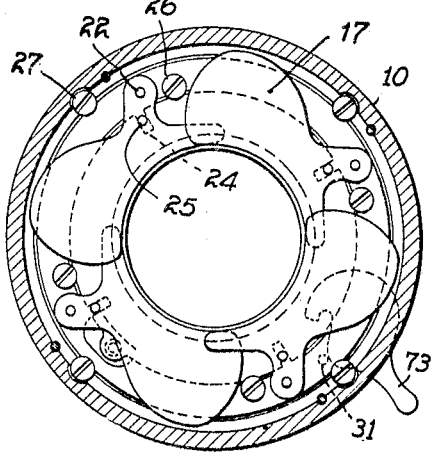
Fig. 6.
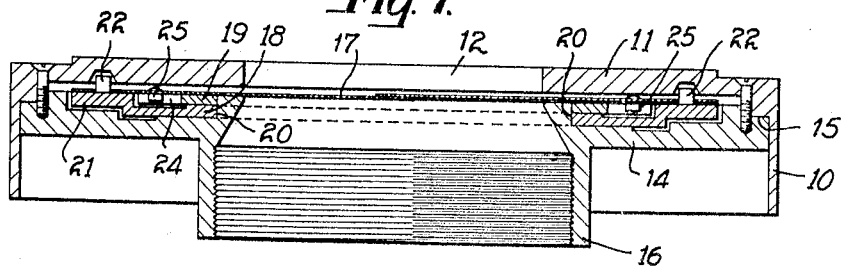
Fig. 7.
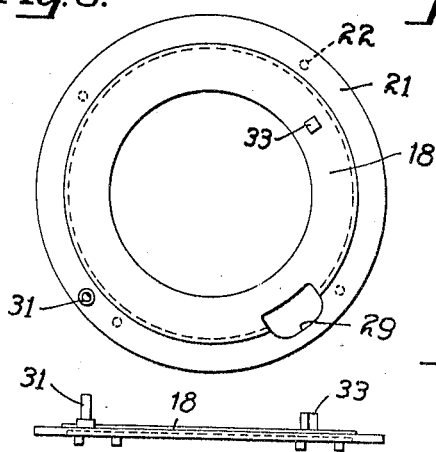
Fig. 8.
Fig. 9.
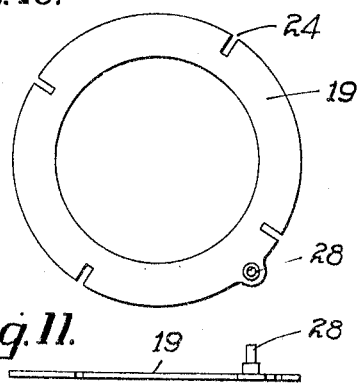
Fig. 10.
Fig. 11.
INVENTOR
Thomas McG. Aiken,
By Archworth Martin,
Attorney.

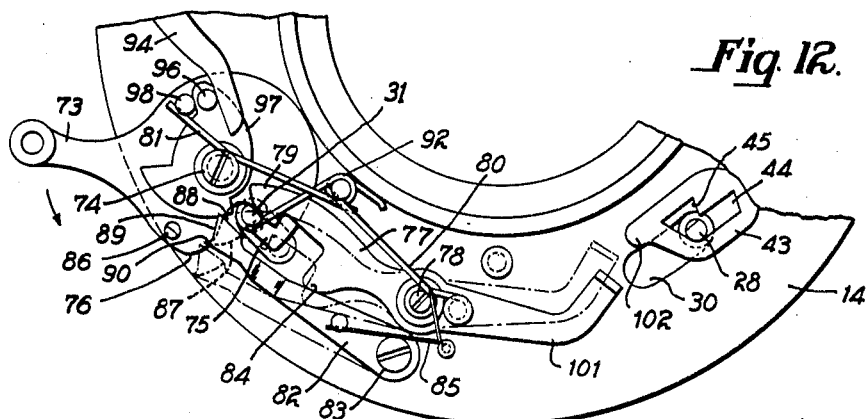
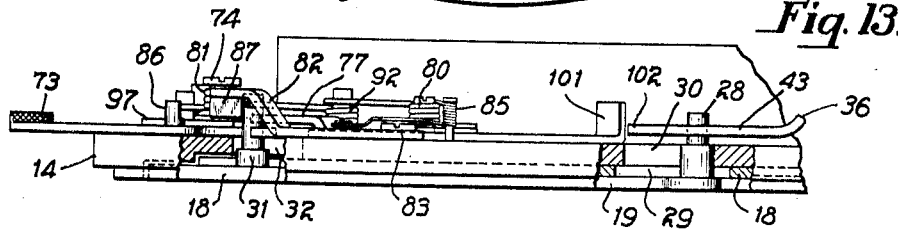
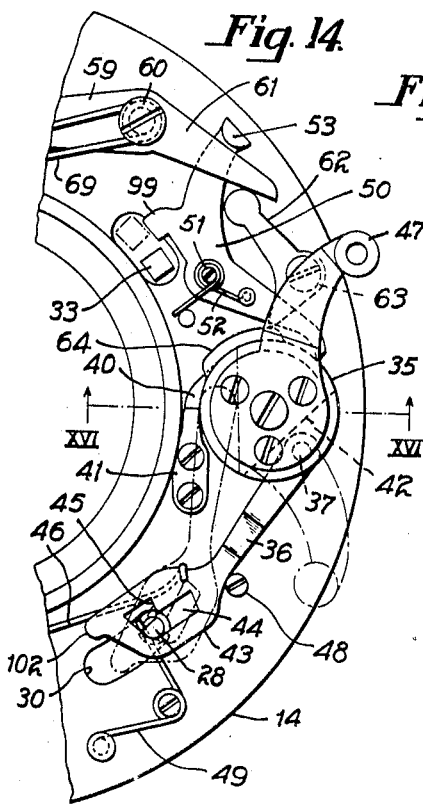
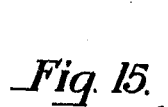
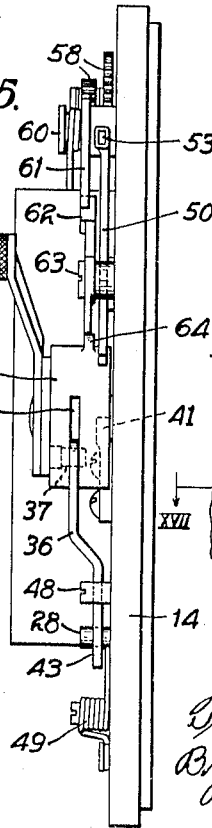
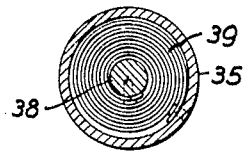

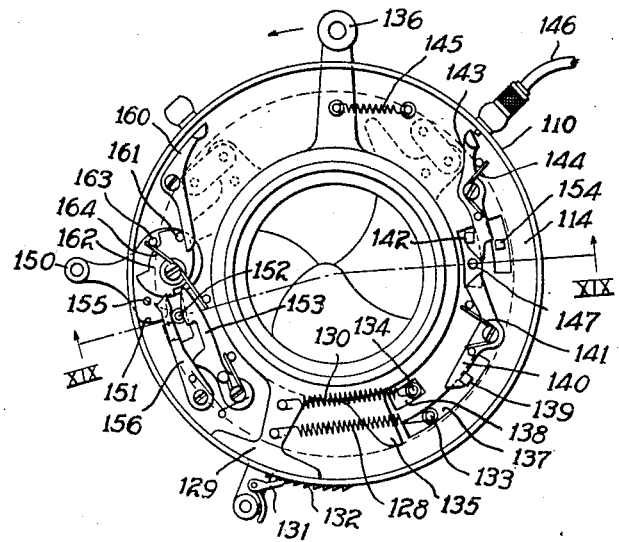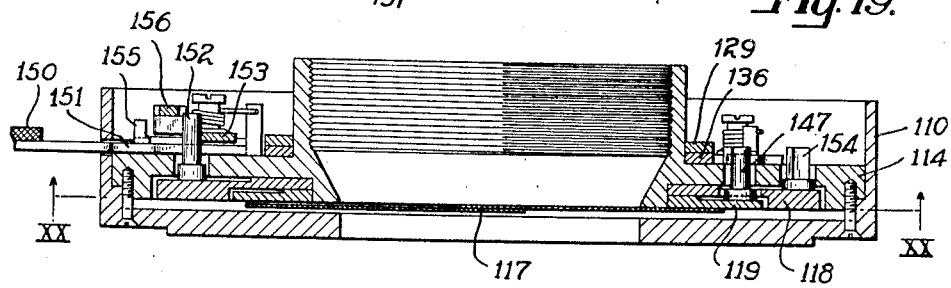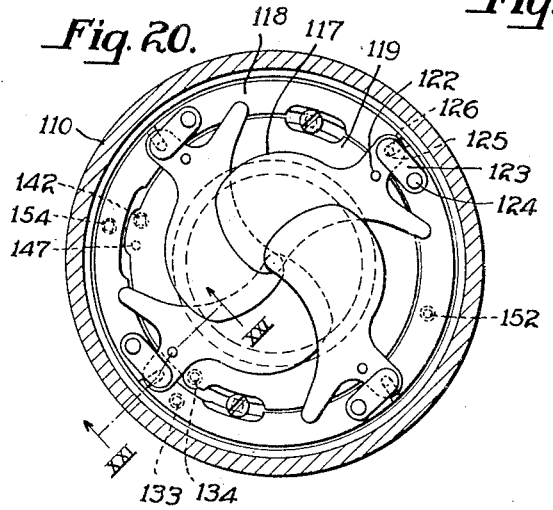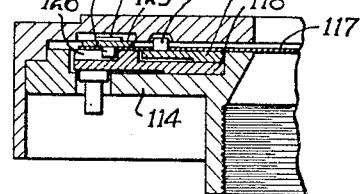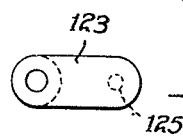

Patented Aug. 8, 1939

2,168,893

UNITED STATES PATENT OFFICE 2,168,893

CAMERA

Thomas McG. Aiken, Pittsburgh, Pa.

Application February 11, 1938, Serial No. 189,997

13 Claims. (Cl. 95—63)

My invention relates to photographic apparatus and more particularly to camera shutters of the type known in the trade as the "compur" shutter, although certain features of the invention may be employed with camera shutters of other types.

In a "compur" shutter, a plurality of shutter blades are adapted to be actuated by a control ring which is operated either manually to obtain time and bulb exposures or automatically to obtain instantaneous and automatically timed exposures. Intricate and extremely delicate mechanism is incorporated in the shutter and many separate adjustments thereof are required to obtain any one of the three types of shutter operations, namely, instantaneous, time or bulb exposures. This operating mechanism may easily become deranged and inoperative. Furthermore, in this type of shutter, the interlocking arrangement between the automatic and the manual operating mechanism renders such mechanism interdependent, thereby requiring care on the part of an operator in operating the shutter.

One object of my invention is to provide a camera shutter which is operative at all times to obtain instantaneous, time or bulb exposures without requiring preselection of the type of shutter operation desired.

Another object of my invention is to provide a pair of operating members for a shutter blade, either of which may be actuated independently of the other to move the shutter blade to obtain an exposure.

Another object of my invention is to provide a shutter of the type above referred to, of generally simplified and improved form having a minimum member of parts.

A further object of my invention is to provide automatically timed shutter-operating mechanism and manual shutter-operating mechanism, either of which may be operated independently of the other.

Still another object of my invention is to provide means for effecting an extremely rapid cycle of shutter blade movement under instantaneous operation.

Figure 2:
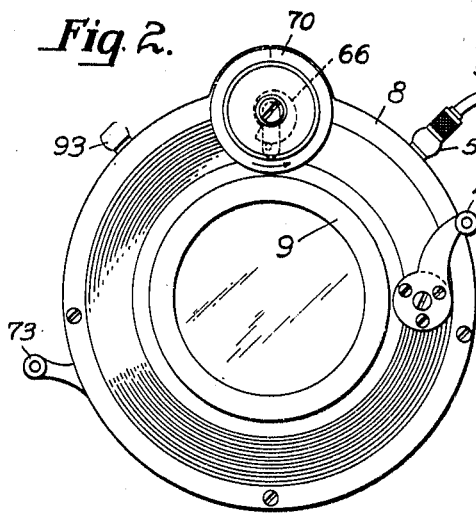
Figure 1:
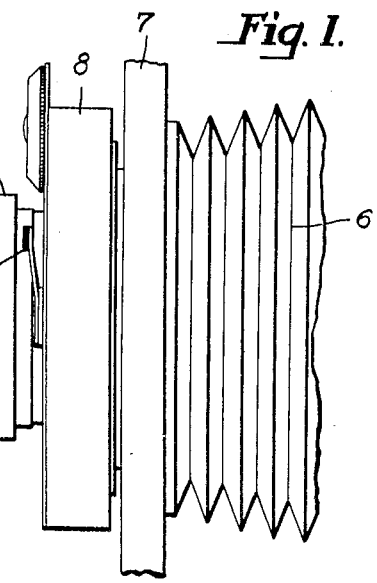
Figure 3:
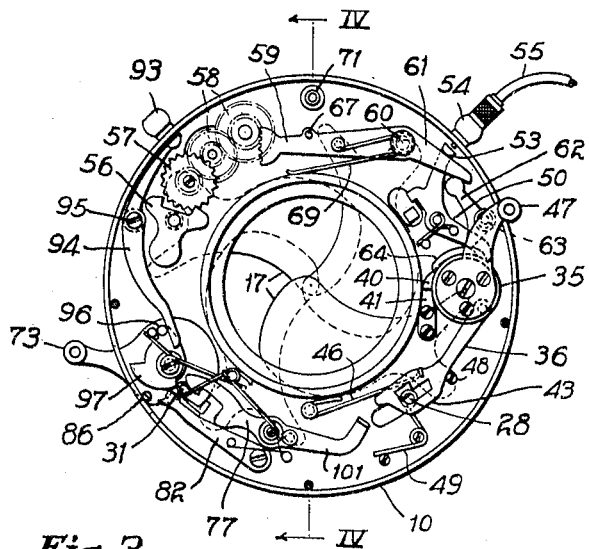
Figure 4:
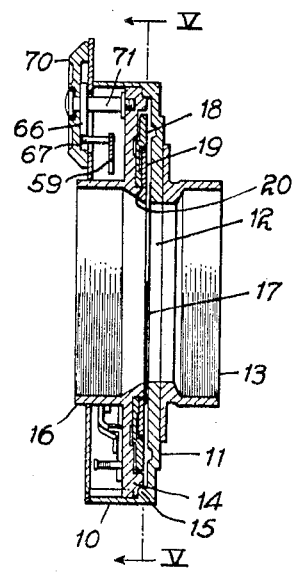

Some of the forms which my invention may take are shown in the drawings, wherein Figure 1 is a fragmentary side elevational view of a camera with my improved shutter applied thereto; Fig. 2 is a front view thereof; Fig. 3 is a view similar to Fig. 2, but with the cover plate removed; Fig. 4 is a view taken on the line IV—IV of Fig. 3; Fig. 5 is a view taken on the line V—V of Fig. 4; Fig. 6 is a sectional view similar to Fig. 5, but showing the shutter blades in open position; Fig. 7 is a view on an enlarged scale taken on the line VII—VII of Fig. 5; Fig. 8 is a front face view of one of the shutter-operating rings; Fig. 9 is an edge view thereof; Fig. 10 is a front face view of another shutter-operating ring; Fig. 11 is an edge view thereof; Fig. 12 is a fragmentary view on an enlarged scale of a portion of the apparatus of Fig. 3, showing the operating mechanism for obtaining time and bulb exposures; Fig. 13 is an edge view thereof, partially in section; Fig. 14 is a fragmentary front elevational view of another portion of the structure of Fig. 3, on an enlarged scale, showing the operating mechanism for obtaining instantaneous exposures; Fig. 15 is a side elevational view thereof; Fig. 16 is a view taken on the line XVI—XVI of Fig. 14; Fig. 17 is a view taken on the line XVII—XVII of Fig. 16; Fig. 18 is a view similar to Fig. 3, but showing a modification; Fig. 19 is a view on an enlarged scale taken on the line XIX—XIX of Fig. 18; Fig. 20 is a view taken on the line XX—XX of Fig. 19, on a reduced scale; Fig. 21 is an enlarged view taken on the line XXI—XXI of Fig. 20; Fig. 22 is a plan view of one of the shutter blade links of Fig. 20, and Fig. 23 is a sectional view thereof.

A portion of a conventional form of camera is indicated by the numeral 6, and is provided with a front plate 7 on which is mounted the camera shutter 8 and is provided with a front lens 9.

Referring to Figs. 3, 4 and 7, the shutter comprises a case 10 of cylindrical form, open at its front side and having a back wall 11 which is centrally apertured at 12. A lens holder 13 is secured to the back wall 11 for the reception of the usual rear lens (not shown). The lens holder 13 is adapted to be attached to the front plate 7 in any well-known manner. A supporting plate 14 is positioned in the case 10 and is spaced from the rear wall 11 of the case by means of an annular rib 15 formed thereon. The plate 14 is provided with a hub 16 which is centrally bored and in axial alignment with the aperture 12. The hub 16 is internally screw-threaded for receiving the front lens 9.

A plurality of shutter blades 17 are disposed between the wall 11 of the case 10 and the rear side of the plate 14, and are arranged normally to prevent the entry of light rays into the camera 6. The shutter blades are pivotally connected to a pair of shutter-operating members or rings 18 and 19, which are journalled for rotative movement on a bearing portion 20 formed integrally on the rear side of the boss 16 of the plate 14.

The rings are disposed axially in side-by-side relation, and the ring 18 is provided with an annular flange 21 which is offset axially relative to the central portion of the plate, so that its rear face lies in a plane common with the rear face of the ring 19 and the rear side of the bearing portion 20. A plurality of rearwardly-projecting pins 22 are secured to the flange 21, each one of the blades 17 being pivotally supported on one of the pins 22. The other ring 19, which may be termed the inner ring, is provided with a plurality of radial slots 24, the pins 22 and the slots 24 being equally spaced in directions circumferentially of the rings 18—19. Each of the blades 17 is provided with a pin 25 which extends into one of the slots 24. As shown more clearly in Figs. 5, 6 and 7, the pins 22 and 25 of each blade are radially offset, so that the blades 17 can be swung to open and closed positions through relative shifting of the pins by movement of either of the rings 18—19.

The rings 18 and 19 are held in assembled relation by means of screws 26, which are threaded into the plate 14, and which have their heads overlying the edge of the inner ring 19, the screw heads merely having abutting engagement with the ring 19 so as to permit rotative movement of the ring 19 relative to the ring 18. Likewise, the assembled rings 18 and 19 are held in position against the rear side of the plate 14 by means of screws 27 that are threaded into the plate 14 and whose heads overlie the edge of the ring 18.

With the parts thus far described in the position shown in Fig. 5, with the shutter blades in closed position, it will be seen that if one of the rings 18—19 is held against rotation, the other ring may be turned and thereby cause the shutter blades to be swung outwardly to open position, as shown in Fig. 6. In this case, the pivotal connection between the shutter blades and the stationary ring is the axis of turning movement of the blades, which turning movement is effected through the points of connection of the blades with the other ring. It is obvious that either ring may be actuated while the other ring is held stationary, thus effecting movement of the shutter blades to open and closed position, in one case the pins 22 serving as the axes of turning movement for the shutter blades and in the other instance the pins 25 serving as the axes of turning movement for the shutter blades. Preferably the rings are rotated in opposite directions, so that the shutter blades are swung in the same direction by actuation of either ring, thereby reducing friction between the blades.

Thus the blades can be moved through a cycle of opening and closing movement through relative movements of the rings 18 and 19, each of which may be operated independently of the other. Since the speed of operation of the shutter blades is dependent upon the rate of rotative movements of the rings 18 and 19, it will be apparent that automatically timed shutter-operating mechanism may be used to actuate the one ring and independent operating mechanism employed to operate the other ring to obtain thereby shutter operation of different durations.

Secured to the ring 19 is a pin 28 which projects forwardly through elongated slots 29 and 30 in the ring 18 and the plate 14 respectively, as shown more clearly in Fig. 13. By means of this pin, the ring 19 may be held stationary while the shutter is being actuated by the outer ring 18, or the ring 19 may be oscillated thereby to effect operation of the shutter blades. The ring 18 is provided with a pin 31 which projects forwardly through an elongated slot 32 in the plate 14, as shown more clearly in Fig. 13, by means of which the outer ring 18 may be manipulated to cause shutter operation. The ring 18 is also provided with a pin 33 which projects forwardly through a slot in the plate 14, as shown more clearly in Figs. 9 and 14, for a purpose to be hereinafter described.

In order to operate the ring 19 to open and close the shutter blades 17 at a speed to obtain normal instantaneous exposures, I provide a spring-driven device having a crank arm 36 which cooperates with the pin 28, as shown more clearly in Figs. 3, 14 and 15, and comprises a block 35 which is rotatably supported on a stud or post 38, that is secured to the disc or plate 14. One end of a flat spring 39 is anchored to the post 38 and its other end is anchored to the block 35, as shown more clearly in Figs. 16 and 17. The spring 39 is under tension and normally tends to turn the block 35 in a counter-clockwise direction, as viewed in Fig. 14. A lug 40 on the block 35 abuts against a stop 41 secured to the plate 14, and serves to limit rotative movement of the block 35 in one direction.

The crank arm 36 has its one end pivotally connected to the block 35 within a slot 42 therein, by means of a crank pin 37. The other end of the crank arm 36 is provided with an enlarged head portion 43, which embraces the pin 28 and is provided with an elongated slot 44 to permit sliding movement of the head portion 43 on the pin 28 during movement of the block 35 to latched position. A lateral recess opens into one end of the slot 44 and forms a shoulder or detent at 45. The spring 39 normally holds the block 35 against the stop 41 with the crank arm 36 in the position shown in full lines in Figs. 3 and 14, with the pin 28 at the end of the slot 44, opposite the lateral recess, whereby the ring 19 is securely held against rotative movement.

When the block 35 is turned to latched position, the crank arm will be moved over center and to its broken line position and when the lateral recess is again opposite the pin 28, the head 43 is swung radially outward by means of a spring 46, with the pin 28 embraced with the lateral recess, thereby positioning the detent 45 behind the pin 28. An arm 47 is secured to the block 35 in order to effect turning movement thereof to latched position. A pin 48 is secured to the plate 14 in position to be engaged by one side of the arm 36 as it returns to its normal position, whereby the head 43 is moved laterally to force the detent 45 from its position behind the pin 28. The pin 48 also serves to maintain the slot 44 in alignment with the pin 28, and during initial movement of the crank arm toward latching position, is engaged by the arm 36 until the lateral recess of the head 43 has been moved past the pin 28.

The pin 28 is normally yieldably held against the one end of the wall of the slot 30 by means of a spring 49. During movement of the block 35 to latched position, the spring 49 prevents displacement of the pin 28 as the head portion 43 is moved relative to the pin, with the pin disposed within the slot portion 44.

A trigger 50 is pivoted to the plate 14 at 51 and is moved into latching engagement with the abutment 40 by means of a spring 52 to hold the block 35 in latched position. Just prior to the latching of the block 35 by the trigger 50, the crank arm 36 has been moved radially outwardly, so that the detent 45 thereof is positioned behind the pin 28. The trigger is provided with an extension 53 extending to a point adjacent to the wall of the case 10, at which point a socket 54 is provided for receiving a cable release member 55.

With the operating parts thus far described in latched position, the shutter may be actuated to obtain an instantaneous exposure. To actuate the shutter, the plunger of the cable release 55 is depressed, whereby the trigger 50 is turned in a counter-clockwise direction, thereby releasing the abutment 40, the driving spring 39 causing the member 37 to be rotated in a counter-clockwise direction and moving the crank arm 36 from its dotted line position in Fig. 14 to its full line position. During such movement, the crank arm 36 pushes the pin 28 and causes the ring 19 to be turned first in a clockwise direction, whereby the shutter blades are moved to open position, and as the crank pin 37 moves past dead center, the arm 36 causes the ring 19 to be turned in the opposite direction, thereby effecting closing movement of the shutter blades. This opening and closing movement of the shutter is, of course, effected rapidly, depending upon the tension of the driving spring 39, and obtains what may be termed instantaneous exposures. During operation of the shutter as just described, the ring 18, of course, is held stationary in a manner to be hereinafter described.

Associated with the driving mechanism is a timing mechanism operative to retard operation of the shutter and obtain automatically-timed periods of shutter opening. This mechanism is of a somewhat well-known form, and may include a pivoted escapement 56 cooperating with an escapement wheel 57 which is driven through a gear train 58, which in turn is driven by a segmental gear formed on one end of an arm 59, pivotally mounted on the plate 14 as indicated at 60. The arm 59 is provided with an extension 61 cooperating with a bell crank 62 pivoted at 63 to the plate 14, one arm of the bell crank 62 being engaged by a cam lobe 64 formed on the member 35. Upon release of the shutter as heretofore described, power from the spring 39 is transmitted through the bell crank 62 to the lever 59, thereby driving the gear train 58.

The arm 59, if it is permitted to swing through its entire range of movement, effects maximum retardation of the shutter before permitting it to move to closed position. For maximum speed of operation of the shutter, the lever 59 is held against rocking movement, whereby the escapement device is not actuated. In order to limit the range of movement of the lever 59 to various amounts between its minimum and maximum range, so that various degrees of retardation of the shutter can be obtained, I provide an adjusting cam 66, which cooperates with a pin 67 carried by the lever 59 for limiting the degree of movement of the lever 59 by the retraction spring 69. The cam 66 is secured to the under side of an adjusting disc 70 which is rotatably mounted on a post 71, secured to the plate 14, the disc 70 being disposed exteriorly of the case 10 in position to permit convenient access thereto for adjustment.

The pin 67 is yieldably maintained in engagement with the periphery of the cam 66 by the spring 69, and it will be seen that by turning disc 70 in the direction indicated by the arrow in Fig. 2, the throw or range of movement of the lever 59 is affected.

Referring now to Figs. 3, 12 and 13, the mechanism for obtaining time and bulb exposures will now be explained. This mechanism is adapted to be manually actuated and comprises a setting lever 73 which is pivoted to the plate 14 on a stud or post 74. It will be recalled that the heretofore described pin 31 projects forwardly of the plate 14. The lever 73 is provided with a hook 75, which embraces the pin 31 and normally maintains the ring 18 against rotative movement. Thus at all times during operation of the shutter to obtain automatically timed or instantaneous exposures, as heretofore described, through reciprocation of the ring 19, the ring 18 is held stationary by the hook 75.

The setting lever 73 is formed with a cam portion 76, which, when the lever is turned in a counter-clockwise direction, as viewed in Fig. 12, is brought into camming engagement with the pin 31 and moves the pin 31 and the ring 18 in a counterclockwise direction to cause opening movement of the shutter blades. Before the cam portion 76 is moved into engagement with the pin 31, the hook 75 is moved away from the pin, thereby releasing it and permitting the said camming movement to be imparted thereto.

A latch 77, pivoted to the plate 14 at 78, moves into latching engagement with the pin 31 at the completion of the camming movement thereof. The latch 77 is provided with a nose portion 79 which bears against the pin 31, the latch being yieldably urged toward latching position by a spring 80. The setting lever 73 is normally yieldably maintained with its hook 75 in engagement with the pin 31 by a spring 81.

A release lever 82, pivoted to the plate 14 at 83, is arranged adjacent to the latch 77 in approximate parallelism therewith. The latch 77 is provided with a lateral extension 84 which is arranged to engage the release lever 82 and move it outwardly when the latch moves into latching engagement with the pin 31. A light spring 85 normally yieldably urges the release lever into engagement with the extension 84.

The setting lever 73 carries a pin 86 which is moved in an arcuate path when the lever is manipulated. The forward or free end of the release lever 82 is disposed adjacent to this arcuate path of movement of the pin 86. The lever 82 is provided at its free end on its under side with a depending triangularly-shaped block 87.

With the parts in the position shown in full lines in Fig. 12, the release lever 82 is held in such position that when the setting lever 73 is turned to effect latching of the pin 31 by the latch 77, the pin 86 moves behind the block 87 to a position at the other side of the lever 82. When the latch 77 moves into latching engagement with the pin 31, the extension 84 thereof engages the lever 82 and swings it to its dotted line position. During retractive movement of the setting lever under the influence of the spring 81, the pin 86 moves along the edge 88 of the block 87. The lever 82 is thus moved by the latch 77 into such position that the pin 86 will engage the face 89 of the block 87 when the lever 73 is again moved in the direction indicated by the arrow, thereby forcing or camming the release lever 82 inwardly and moving the latch 77 out of latching engagement with the pin 31. The face 89 of the triangular block 87 is formed with a stop lug 90, which limits movement of the setting lever 73 after the pin 31 has been released, so that the pin 31 will not be again moved through continued movement of the setting lever 73.

When the pin 31 has been released from the latch 77, a spring 92 moves the pin 31 in a clockwise direction, whereby the shutter blades are moved to closed position.

The manually-actuated mechanism just described is provided in order to effect opening of the shutter for as long a time duration as is desired, whereupon the lever 73 is reactuated to effect closure of the shutter. In order to permit bulb operation of the shutter, I provide another socket 93 into which the cable release 55 may be inserted to effect operation of a lever 94 which is pivotally mounted on the plate 14, at 95. The lever 94 cooperates with a pin 96 carried by a cam 97, which is loosely mounted on the stud 74. The lever 73 carries a pin 98 with which the pin 96 cooperates in order to effect turning movement of the lever 73. When the lever 94 is actuated by the cable release or other suitable device, the pin 96 engages the pin 98 and causes the setting lever 73 to be turned in a direction to cause the shutter to be opened, as heretofore described. During opening movement, however, the cam 97 engages the nose portion 79 of the latch 77, thereby preventing latching movement of the latch 77. Thereupon, after a predetermined time interval, determined by the operator, the lever 94 is released. Whereupon the spring 81 returns the setting lever 73 and the cam 97 to their normal positions, the shutter being moved to closed position by the spring 92.

It will be seen that during operation of the shutter to obtain time and bulb exposures by the operation of the shutter blades by the ring 18, that the other ring 19 is held stationary by the pin 28 and its operating arm 36. Likewise, when effecting such time operation of the shutter, the heretofore described pin or post 33 is moved into such position each time the shutter is open as will prevent operation of the trigger 50. The trigger 50 is provided with a lug 99, and the stop 33 is moved into position adjacent the lug 99 whenever the shutter has been manually opened, so that the trigger 50 cannot be actuated.

From the foregoing, it will be seen that the shutter may be operated by either of the operating rings 18 or 19, by either of the operating mechanisms associated therewith, independently of the other. However, in case the manual shutter-operating mechanism is being use and it is desired to utilize the automatic shutter-operating mechanism it is only necessary to operate the lever 47 thereof. If for any reason the shutter happens to be in open position when the operator desires to effect automatic operation of the shutter, I provide means for causing the shutter to be moved to close position during movement of the automatic mechanism to latched position. As best seen in Figs. 3 and 12, the latch 77 is provided with a trip extension 101 which, when the manual shutter-operating mechanism is in latched position holding the shutter open, is disposed, as shown by dotted lines, in the path of movement of the crank arm 36.

The head 43 of the crank arm 36 is provided with a nose portion 102 which engages the trip extension when the block 35 is moved toward latched position, thereby causing the latch 77 to release the pin 31 and permitting the shutter to be closed by the spring 92. Also, if the operator has moved the automatic mechanism into latched position and for some reason desires to manually actuate the shutter, he merely manipulates the lever 73 as heretofore described. So long as the shutter is in open position, the trigger 50 cannot be actuated to release the automatic shutter-operating mechanism. Thus, at no time is there any danger of exposing the sensitive material at the wrong time, and also there is no possibility of attempting an improper manipulation of the shutter, since it is at all times operative to obtain the desired type of shutter operation.

Referring now to Figs. 18 to 23, I show a modified form of structure, wherein provision is made for extremely rapid operation of the shutter blades, under instantaneous operation. In this form of device, operating rings 118 and 119 correspond to the rings 18 and 19 of the other form, in that through oscillation thereof the shutter blades 117 are actuated. In this instance each of the shutter blades 117 is pivotally connected to the ring 119 by a pin or stud 122 that is carried by the ring, and extends through the blade. Each blade is connected to the ring 118 through a link 123, which at one end is pivotally connected to the ring 118 by a rivet or stud 124. The other end of the link 123 carries a stud 125 that extends through a hole in the heel of the blade. The links 123 overlie the outer sides of the blades, and the studs 125 extend into arcuate slots 126 cut in the face of the ring 118, so that when there is relative movement of the rings and pivotal movement of the blades about the points 122, there will be no binding of the parts. The links 123 are provided with slightly raised bosses or surfaces 127 which serve as spacers to prevent the links 123 binding the blades with frictional engagement. The sides of the blades are, therefore, supported between adjacent surfaces of the links 123 and the ring 118, such surfaces supporting the heel of the blade against twisting and tearing when operating forces are exerted thereon by the pin 125, it being understood that the blades are of extremely thin material.

The ring 118 has one end of a tension spring 128 connected thereto, the other end of the spring being connected to a tensioning lever 129. A tension spring 130 connects the ring 119 to the lever 129. The lever 129 is adjustable to vary the tension of the springs 128 and 130 to a desired degree, depending upon the desired rapidity of operation. This adjustment is effected by means of a pawl 131 which is carried by the lever, and a rack 132 formed on the case 110.

The connections of the springs 128 and 130 to their respective rings are effected through outstanding pins 133 and 134 respectively, that are engaged by an arm 135 which is formed on a tensioning ring or lever 136, when said lever is swung in a counter-clockwise direction. The pins 133 and 134 extend through slots 137 and 138 respectively, that are formed in the base plate 114.

It will be seen that upon swinging of the lever 136 in a counter-clockwise direction, the pins, and consequently the rings 118 and 119, have rotative movement imparted thereto, simultaneously placing the springs 128 and 130 under increased tension. At the completion of this movement, a pin 139 carried by the ring 118 will be moved into engagement with a latch lever 140, as shown in Fig. 18, the latch lever being yieldably maintained in operative position by a spring 141. Simultaneously a pin 142 carried by the ring 119 is brought into latching engagement with a trigger lever 143 that is biased toward latching position by a spring 144. During this movement of the lever 136, the rings are moved as a unit and, therefore, there is no operation of the shutter blades. When the lever 136 is released, it will be returned to its initial position by a spring 145, so that its arm 135 will be moved backwardly and not interfere with return movement of the rings.

The parts are now in position to effect an instantaneous exposure. Upon operation of the plunger of a cable release 146 in the usual manner, the trigger 143 will be rocked in a counter-clockwise direction, thus releasing the ring 119 which, under the action of its spring 130, is snapped in a clockwise direction. During this clockwise movement of the ring 119, the ring 118 is in stationary position and consequently the shutter blades will be opened. At this stage, a stud or pin 147 carried by the ring 119 engages the heel of the lever 140, thus rocking it in a clockwise direction and releasing the ring 118. Further movement of the ring 119 is prevented by the pin 134 engaging the rear end of the slot 138, but the spring 128 is effective to turn the ring 118 in a clockwise direction, thus closing the shutter blades. It will be seen that the cycle of opening and closing movement just described is very rapid, since the ring 118 is under closing tension and is released at the instant that the blades reach their open position. The rapidity of opening and closing movement can be varied through changes in spring tension which are made by adjustment of the arm 129.

In order to effect time or bulb operations of the shutter, the rings 118 and 119 are placed under tension as above described, namely through swinging of the setting lever 136 in a counter-clockwise direction. With the rings thus tensioned, a hand lever 150 is turned in a counter-clockwise direction. The lever carries a cam surface 151 that moves into engagement with a stud 152 projecting outwardly from the ring 118. The ring 118 is thus shifted in a counter-clockwise direction and held in that position by a latch 153 into which the stud 152 is moved. During this movement of the ring 118, the ring 119 is stationary and, therefore, the shutter blades will be opened. While the ring 118 is thus being shifted to open the blades, a stud 154 carried thereby will be moved into overlying position with the edge of the trigger 143, to serve as a stop for preventing actuation of said lever by the cable release 146.

A pin 155 carried by the lever 150 will, when the lever 150 is being swung to shutter-opening position, pass behind an arcuate shoulder on the rear side of a release lever 156, and the lever 150 can thereafter be actuated to depress the lever 156 and the latch 153, as in the case of the corresponding members 73, 82 and 77 of Fig. 3. When the latch 153 is released by a second actuation of the lever 150, which disengages the stud 152, the ring 118 will be swung by its spring 128 in a clockwise direction to close the shutter. During movement of the ring 118 to a "set" open position, as above described, its stud 139 will slide along the latch lever 140. Upon release of the ring 118, as above described, the stud 139 will be returned to the position shown in Fig. 18 and there stopped.

Bulb operation is effected through a lever 160 that engages a stud 161 on a cam disc 162. The cam disc engages a stud 163 on the lever 150 and rocks said lever to effect shutter-opening movement of the ring 118, by causing said lever to push the stud 152 in a counter-clockwise direction. The cam 162 engages the end of the latch 153 and holds it away from the stud 152. Upon release of the lever 160, the spring 164 that urges the lever 150 in a clockwise direction will cause the lever and its stud 163 to return the cam disc 162 to its initial position, thus releasing the stud 152 and permitting the ring 118 to be moved in shutter-closing direction, under the tension of its spring 128.

While from the foregoing it will be seen that I have disclosed and described my invention as applied to a particular type of shutter, it will be apparent that certain features thereof may be employed with shutters of other types.

I claim as my invention:

1. In a shutter for cameras, the combination with a shutter blade having a normal closed position and an open position, of a pair of movable operating members therefor, means pivotally connecting said blade to each of said members for swinging movements in arcuate paths, through movement of either member, means associated with each of said members whereby either of said members can be operated independently of operation of the other member, to impart opening and closing movements to said blade, and means for preventing shutter-operating movement of one of said members while the other member is being operated.

2. In a shutter for cameras, the combination with a shutter blade having a normal closed position and an open position, of a pair of movable operating members therefor, means pivotally connecting said blade to each of said members for swinging movements in arcuate paths, through movement of either member, means associated with each of said members whereby either of said members can be operated independently of operation of the other member, to impart opening and closing movements to said blade, and a stop carried by one of said members for movement into a position when said one member is moved to open shutter position, to cooperate with the other member and prevent shutter-operating movement thereof.

3. In a shutter for cameras, the combination with a shutter blade, of a pair of cooperating members supporting said blade for swinging movement in arcuate paths, through independent movement of either of said members, means for yieldably maintaining said members normally in a closed shutter position, means including a power spring for actuating one of said members to impart automatically timed opening and closing movements to said blade, and manually operable means for actuating the other member to impart manually-controlled opening and closing movements to said blade.

4. In a shutter for cameras, the combination with a shutter blade, of a pair of operating members supporting said blade for swinging movement in arcuate paths, through independent movement of either of said members, means for yieldably maintaining said members normally in a closed shutter position, means including a power spring for actuating one of said members to impart automatically timed opening and closing movements to said blade, and manually-operable means for actuating the other member to impart manually-controlled opening and closing movements to said blade, the axis of swinging movement of said blade being located on one of said members when the other member is being actuated.

5. In a shutter for cameras, the combination with a shutter blade, of a pair of operating members supporting said blade for swinging movement in arcuate paths, through independent movement of either of said members, means for yieldably maintaining said members normally in a closed shutter position, means including a power spring for actuating one of said members to impart automatically timed opening and closing movements to said blade, manually operable means for actuating the other member to impart manually-controlled opening and closing movements to said blade, and means moved by the said other member into position for preventing actuation of the said one member under the influence of said spring when said blade is in open position.

6. In a shutter for cameras, the combination with a shutter casing having an aperture and a plurality of shutter blades arranged in cooperative relation to close said aperture, of a pair of rings journalled in the casing concentrically of the aperture, means pivotally connecting said blades to said pair of rings at radially offset points, for effecting outward swinging movement of said blades to open position relative to the aperture, through rotative movement of either of said rings, automatic mechanism comprising a crank device and a power spring, for oscillating one of said rings to impart automatically timed opening and closing movements to said blades, and manually operable means for oscillating the other ring to impart opening and closing movements to said blades.

7. In a shutter for cameras, the combination with a shutter casing having an aperture and a plurality of shutter blades arranged in cooperative relation to close said aperture, of a pair of rings journalled in the casing concentrically of the aperture, means pivotally connecting said blades to said pair of rings at radially offset points, for effecting outward swinging movement of said blades to open position relative to the aperture, through rotative movement of either of said rings, automatic mechanism associated with one of said rings to impart opening and closing movements to said blades, and manual means for actuating the other ring to impart opening and closing movements to said blades.

8. In a shutter for cameras, the combination with a shutter blade, of a pair of operating members supporting said blade for swinging movement in arcuate paths, through independent movement of either of said members, means for yieldably maintaining said members normally in a closed shutter position, means for moving one of said members to open shutter position, a latch for holding said one member in said open shutter position, mechanism including a power spring for actuating the other member to impart automatically timed opening and closing movement to said blade, a manually movable member for initially tensioning said spring, and means operable during tensioning of said spring for actuating said latch, to release said one member and permit movement thereof to its closed shutter position.

9. In a shutter for cameras, the combination with a shutter blade, of a pair of operating members supporting said blade for swinging movement in arcuate paths, through independent movement of either of said members, means for yieldably maintaining said members normally in a closed shutter position, manually operable means for moving one of said members to open shutter position, mechanism including a power spring for actuating the other member to impart automatically timed opening and closing movements to said blade, means for moving said mechanism into latched position with said spring under tension, a trigger adapted to be manually actuated for releasing said mechanism, and a stop on said one member and movable therewith into position to prevent release movement of said trigger when the said blade is in open position.

10. In a shutter for cameras, the combination with a shutter blade, of a pair of independently-operable members for actuating the blade, means including a power spring for actuating one of said members to move the blade through a cycle of opening and closing movements, manually-operable means for actuating the other member to impart opening and closing movements to the blade, and means moved by the said other member into position to prevent actuation of the said one member when the said blade is in open position.

11. In a shutter for cameras, the combination with a shutter blade, of a pair of independently-operable members for actuating the blade, spring means for imparting shutter-closing movement to said members, means including a power spring for actuating one of said members to impart automatically-timed opening and closing movements to the blade, manually operable means for actuating the other member to impart opening movement to the blade, means for latching said other member, a manually-operable element for initially tensioning the power spring, and means operable through movement of said manually-operable element for releasing the latch.

12. In a shutter for cameras, the combination of a shutter blade having a normally closed position and an open position, of a pair of movable operating members therefor, means pivotally connecting said blade to each of said members for swinging movements in arcuate paths through relative movement of said members, tensioning means for each of said members, means for simultaneously moving said members to tensioned position, means for releasably retaining each of said members in its tensioned position, means for releasing one of the said members for movement from its tensioned position, and means for automatically releasing the other member from its tensioned position during movement of the first-named member.

13. In a shutter for cameras, the combination of a shutter blade having a normally closed position and an open position, of a pair of movable operating members therefor, means for pivotally connecting said blade to each of said members for swinging movements in arcuate paths through relative movement of said members, tensioning means for each of said members, means for simultaneously moving said members to tensioned position, means for releasing one of the said members for movement from its tensioned position, means for automatically releasing the other member from its tensioned position during movement of the first-named member, and means for moving one of said members through an opening and closing cycle independently of the other member.

THOMAS McG. AIKEN.